March 30, 1943.   W. J. POCH   2,315,377
ELECTRICAL APPARATUS
Filed June 1, 1940
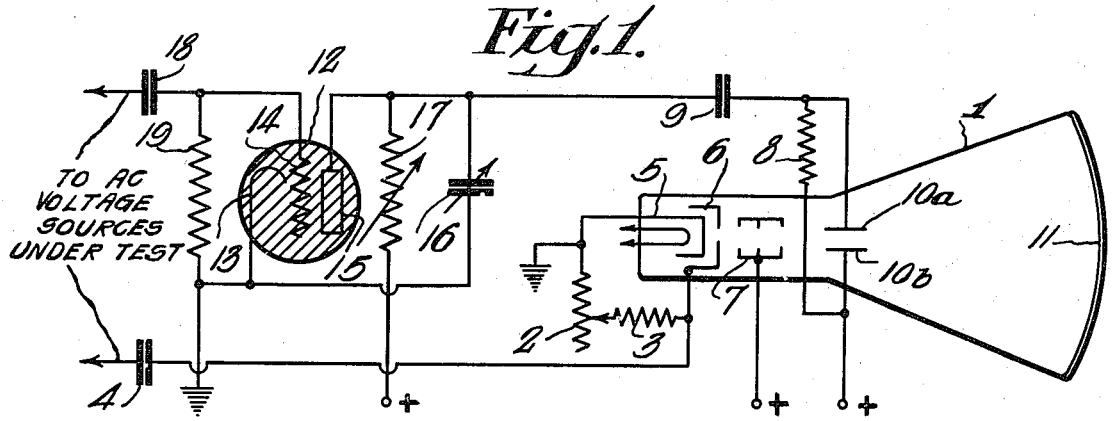
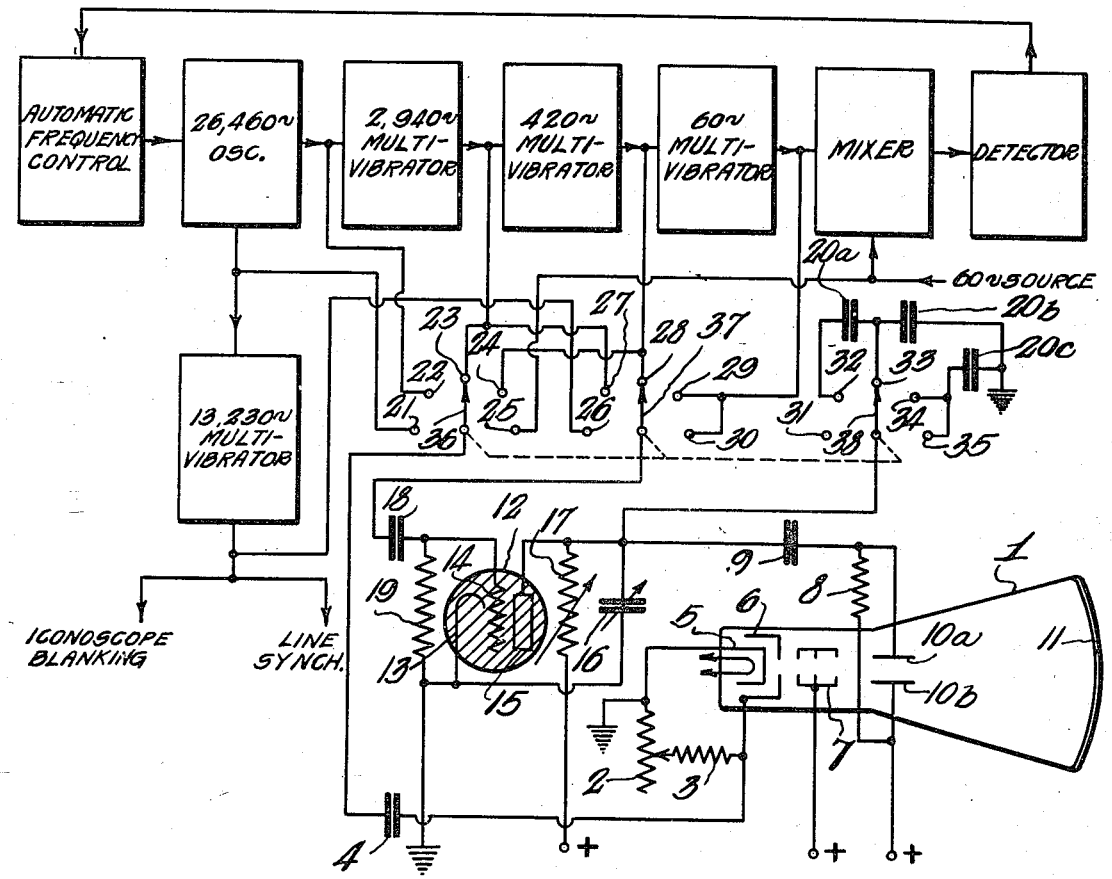
Inventor
Waldemar J. Poch
By
Attorney Patented Mar. 30, 1943

2,315,377

UNITED STATES PATENT OFFICE 2,315,377

ELECTRICAL APPARATUS

Waldemar J. Poch, Collingswood, N. J., assignor to Radio Corporation of America, a corporation of Delaware Application June 1, 1940, Serial No. 338,333

12 Claims. (Cl. 172—245)

This invention relates to frequency indicators and more particularly to multivibrator speed indicating methods and means.

It is often desirable to compare the harmonic relation of alternating current voltage sources such as the frequency relation existing between the input and output of frequency changers and to indicate the phase relation between two alternating current voltage sources.

In television systems employing cathode ray tubes in a television camera and receiver, it is usually customary to utilize electric impulses occurring at a comparatively high frequency for controlling the deflection of the cathode ray in its direction of rapid motion, for example horizontally, and other impulses occurring at a comparatively low framing frequency for controlling the deflection of the cathode ray in its direction of slower motion, for example vertically. These impulses may be generated mechanically, but it has been found preferable to generate them electrically, and this can be accomplished by means of electric discharge devices, such as vacuum tubes, operated in frequency divider circuits. In this manner, moving parts are avoided. However, when such circuits are used to generate these impulses, it becomes necessary to provide an accurate measuring means to check carefully the operation of the frequency divider or multivibrator circuit.

Multivibrator circuits adapted to generate synchronizing pulses sometimes comprise a chain of stages, each stage changing the frequency by a predetermined factor. It is necessary that this factor remain constant in each stage of the frequency divider. Should this factor change, it would tend to throw the synchronizing equipment out of step and cause serious distortion in the picture image. Therefore, it is necessary to check very carefully the operation of not only the chain of frequency dividing circuits, but also of each individual stage to make sure that each link of the frequency divider chain is functioning in its proper manner.

In television systems as now operated, a multivibrator or frequency divider in which an indicator is provided for each stage of the frequency dividing circuit has found some considerable use. In such apparatus, indicating means which are tuned to a fixed frequency representing the output frequency of each stage of a chain of a multivibrator circuit are customarily employed. It has been found, however, in such apparatus that where the basic frequency, for example the power supply frequency of 60 cycles does not remain substantially constant, or where the assumed 60-cycle source of voltage is supplied by some auxiliary means, such as a portable motor generator, so as to be subject to some fluctuation, a fixed tuned indicating means is not well suited to indicate the proper operation of the frequency divider circuit.

This invention provides a method and means for indicating directly the frequency step-down or dividing ratio so that a basic frequency of 60 cycles, for example, or a frequency which deviates considerably from 60 cycles may be used, and the indicating means still show the proper operation of each of the stages of the multivibrator circuit, if their step-down ratio is correct.

In the operation of television apparatus, it is possible to arrange the indicating system of the invention so that one set of deflecting plates of a cathode ray indicating tube is excited by a sawtooth wave generator whose frequency is controlled by one selected frequency. The control electrode of the cathode ray tube is excited by another frequency under test. It is preferable to apply the higher of the two frequencies to the control electrode. The application of this energy to the control electrode causes the beam to be interrupted periodically so that a series of dots appears on the fluorescent screen, the number of which is indicative of the harmonic relation of the frequency of the two alternating current voltage sources under test.

The principal object of this invention is to provide a method and means for indicating the harmonic relation of a plurality of alternating current voltage sources.

Another object of this invention is to provide a method and means for testing deflecting impulse generators.

Still another object of this invention is to provide a visual testing means for indicating the phase relation between two sources of alternating current voltage.

Other and incidental objects of the invention will be apparent to those skilled in the art from a reading of the following specification and an inspection of the accompanying drawing, in which Fig. 1 is a circuit diagram of one form of this invention;

Fig. 2 is a block diagram showing another form of this invention.

Referring to Fig. 1, the visual indicating means comprises a cathode ray tube 1 having therein a cathode 5, a control electrode 6, an accelerating electrode 7 and deflecting plates 10a and 10b or other deflecting means. When cathode 5 is heated by its filament, electrons are given off. These electrons cause the control electrode 6 to have produced thereon a negative charge with respect to the cathode 5. Resistance 3 and variable resistance 2 are connected in series between the control electrode 6 and the cathode 5 to allow any charge in excess of the desired charge or bias to leak off the control electrode 6 back to the cathode 5.

One of the alternating current voltages whose frequencies are to be compared is supplied to the control electrode of the cathode ray tube 1 through the coupling capacity 4. The negative charge or bias on the control electrode 6 is so adjusted, by varying resistance 2, that only the positive peaks of each cycle of the alternating current voltage under test will cause the negative bias on the control electrode 6 to swing sufficiently in the less negative direction to allow the cathode ray electron beam to pass through the control electrode 6 and impinge upon the luminescent or fluorescent target element 11 to cause by impact a bright spot to appear thereon. It follows that the light spot on the target element 11 will reappear at the frequency of the alternating current impressed upon the control electrode 6.

It is customary to apply a voltage having a saw-tooth wave form to the deflecting plates of a cathode ray oscilloscope to cause the spot produced by the cathode ray to sweep slowly across the target element 11 in one direction and rapidly in the opposite direction. The saw-tooth wave generator illustrated in Fig. 1 comprises a tube 12 which may be of the gaseous discharge type and has a cathode 13, a control electrode 14 and an anode 15. The anode voltage is supplied by an indicated direct current voltage source through variable resistance 17.

When the control electrode of an electron discharge tube is driven sufficiently positive, the tube will pass current between its cathode and anode. When an alternating current voltage from a second source under comparison is impressed upon the grid or control electrode 14 of the gaseous discharge tube 12 through condenser 18, it causes the discharge tube 12 to pass current between its cathode 13 and anode 15 periodically at a rate equal to the frequency of the second alternating current voltage source. Each time the impressed alternating current voltage from the second source swings the control electrode 14 sufficiently positive, the tube 12 discharges condenser 16 almost instantaneously. The deflecting plate 10a of the cathode ray tube 1 is coupled to condenser 16 through condenser 9 so that when condenser 16 is discharged the potential on deflecting plate 10a is carried negative with respect to deflecting plate 10b, thus causing the cathode ray beam to instantaneously sweep the target element 11 in the direction of the deflecting plate 10b because the beam is attracted by the more positive plate 10b. Each time the impressed alternating current voltage swings the control electrode 14 negative, the tube 12 stops passing current and condenser 16 charges slowly through resistance 17. It follows that the potential of the deflecting plate 10a slowly swings positive with respect to deflecting plate 10b and this causes the electron beam slowly to sweep the target element 11 in the direction of deflecting plate 10a. A resistance 8 is shown connected across the deflecting plates 10a and 10b which resistance is also connected to a positive voltage source. This positive voltage source applies to the deflecting plate 10b a fixed positive potential. The potential on the deflecting plate 10a will be the same as the potential on the plate 10b under conditions of no signal. However, when a signal is impressed upon deflecting plate 10a through condenser 9 a corresponding voltage drop in resistance 8 will cause a difference in potential between deflecting plates 10a and 10b which will in turn cause the electron beam to sweep the target element 11 in accordance with this applied alternating current voltage as previously described. The center line of the deflection of the electron beam will remain substantially in the center of the luminescent target element 11. Because of the resistor 8, the axis of the saw-tooth wave voltage, impressed upon the deflecting plate 10a, will be maintained at such a position that there will be no difference in potential between deflecting plates 10a and 10b when the electron beam sweeps past the axis.

The deflection of the cathode ray beam caused by one selected source of alternating current voltage and the interruption of the electron beam caused by the first selected alternating current voltage will cause an indication on the luminescent target 11 which is a representation of the frequency relation of the two alternating current voltage sources. Should the frequency of the voltages under comparison be the same, a single dot or short dash will appear on the viewing target when the electron beam cut-off point is adjusted by varying the resistance 2 so that the cathode ray will trace only a very small portion of the cycle on the viewing target. The reason for this is that the electron beam is struck or turned on at the same place in the horizontal sweep of the cathode ray. Should the frequency of the alternating current voltage applied to the control electrode circuit be twice the frequency of the alternating current voltage supplied to the deflecting plates, two dots will appear on the target 11 of the cathode ray tube 1 because the electron beam caused by cathode 5 and controlled by control electrode 6 will be struck or turned on twice during one horizontal sweep of the cathode ray caused by the lower frequency applied to the deflecting plates 10a and 10b.

Fig. 2 shows a means of indicating the frequency change ratio of any multivibrator in an impulse generator. The elements shown in block diagram represent an electric impulse generator which is designed to supply horizontal synchronizing pulses and vertical synchronizing pulses or framing pulses having the proper frequency relation for producing interlaced scanning, an example of which is described and claimed in patent to Alda V. Bedford 2,178,218, dated October 31, 1939. The impulse generator comprises an oscillator or multivibrator furnishing alternating current voltage at a frequency which may be assumed as twice the line frequency of any television image being reproduced, and which can for illustration purposes be considered as being of 26,460 cycles per second for a 441 line picture repeated 30 times per second. The output of this oscillator or multivibrator operating to develop energy at 26,460 cycles is fed to a second multivibrator whose output frequency may be assumed as being at 2,940 cycles per second or one-ninth of the main oscillator frequency. The output of this second multivibrator frequency of 2,940 cycles per second is fed to another of a series of multivibrators which divides this frequency by seven to produce an output frequency of 420 cycles per second. Another multivibrator in this series produces a 60 cycle frequency from the output of the 420 cycle multivibrator which is the frequency desired for vertical deflection or framing. The 26,460 cycle frequency of the main oscillator or multivibrator is also fed to another multivibrator which divides this frequency by two in order to produce a horizontal deflecting frequency or line frequency of 13,230 cycles per second. This same multivibrator is customarily used also to furnish a "blanking" impulse which is applied to the image scanning tube to extinguish the scanning beam on its return path across the mosaic element thereof. This impulse when used to control a scanning tube of the type known as the "iconoscope," is frequently referred to as the iconoscope blanking pulse, since it acts to prevent the development of output signal from the scanning tube devices on the rapid portion of the scanning beam deflection.

The 60 cycle output is supplied to a mixer which compares this selected frequency of 60 cycles with an auxiliary 60 cycle source in such a manner that a control voltage is furnished for an automatic frequency control means controlling the 26,460 cycle frequency of the main oscillator or multivibrator. Such an automatic frequency control circuit is described in Smith Patent No. 2,132,654 granted on October 11, 1938, assigned to Radio Corporation of America. The 60 cycle auxiliary source heretofore mentioned may be from the standard power supply lines or it may be produced by an auxiliary motor generator. If the auxiliary source of 60 cycle alternating current is supplied by a motor generator it is likely to vary slightly from 60 cycles. This slight variation will correspondingly control the master oscillator or multivibrator so that its output frequency will vary slightly from 26,460 cycles and correspondingly the frequency output of each of the other multivibrators will also vary slightly.

A series of unicontrolled switches used to supply the deflection control energy and the beam control energy to the viewing tube I have corresponding terminals so connected that in any one position of selector arms 36, 37 and 38 the input and output frequency of any selected multivibrators can be compared.

In the first position, the selector arms 36, 37 and 38 make contact with switch points 21, 26 and 31, respectively. In this position the input frequency of 26,460 cycles which is supplied to the 13,230 cycle multivibrator is impressed on the control electrode 6 of the cathode ray tube I through terminal 21, switch arm 36, and coupling condenser 4. This supplied energy causes a periodic interruption of the cathode ray beam in tube I to occur at a rate of 26,460 times per second. The output of the 13,230 cycle multivibrator is impressed on the control electrode 14 of the tube 12 through terminal 26, switch arm 37 and coupling condenser 18.

In this first position the contact arm 38 makes contact with the terminal 31. The capacity of condenser 16 is so chosen that it allows the cathode ray to scan the full width of the fluorescent screen 11 when there is an impressed frequency of 13,230 cycles per second, which occurs in the first position of the selector arms. The frequency of the alternating current voltage impressed upon the control electrode 6 of the cathode ray tube I of 23,460 cycles per second is twice that of the alternating current voltage frequency of 13,230 cycles per second impressed upon the control electrode 14 of the gaseous discharge tube 12, so that it follows, as previously described, there will appear upon the luminescent target area 11 two dots or two short dashes if the 13,230 cycle multivibrator is properly functioning.

In the second position of selector arms 36, 37 and 38, the selector arm 36 makes contact with terminal 22 which is connected to the output of the main oscillator of 26,460 cycles per second or the input of the 2940 cycle multivibrator. This frequency is applied to the control electrode 6 of the cathode ray tube through terminal 22, contact arm 36 and coupling condenser 4. Selector arm 37 contacts terminal 27 for supplying the control electrode 14 of the tube 12 with a frequency of 2940 cycles per second from the output of the 2940 cycle multivibrator. The ratio of the input and output frequencies of the 2940 cycle multivibrator being assumed as equal to 9, it follows that nine dots or short dashes will appear across the luminescent target area 11 when the selector arms are in the second assumed position, and the 2940 cycle multivibrator is functioning properly.

In this second position, the contact arm 38 will make contact with terminal 32 which causes the series condensers 20a and 20b to be placed in parallel with condenser 16 in order to increase the storage capacity and slow up the deflection of the cathode ray so that at this lower frequency of 2940 cycles per second, the cathode ray will also sweep the entire scale of the luminescent target area 11. This increase in capacity will make little change on its discharge rate or the corresponding substantially instantaneous return trace of the cathode ray in the direction of deflector plate 10b.

When the contact arms 36, 37 and 38 are in the third position, as illustrated in the drawing, the input of the 420 cycle multivibrator of 2940 cycles, is impressed upon the control electrode 6 of the cathode ray tube, and the output of the 420 cycle multivibrator is impressed upon the control electrode 14 of the gaseous discharge tube 15. Contact 38 selects the proper predetermined capacity to cause the cathode ray to deflect full scale at 420 cycles and it follows that if this multivibrator is functioning properly, seven dots will appear on the fluorescent screen 11 because of the selected ratio of the input and output frequencies.

In the fourth position of the contact arms 36, 37 and 38 the output of the 420 cycle multivibrator is impressed upon the control electrode of the cathode ray tube and the output of the 60 cycle multivibrator controls the potentials applied to the deflecting plates 10a and 10b of the cathode ray tube through terminal 29. If this 60 cycle multivibrator is functioning properly seven dots or short dashes will again appear on the target area 11 by reason of the fact that 60 cycles is one-seventh of 420 cycles.

In position 5 of the contact arms 36, 37 and 38 an auxiliary source of 60 cycles is impressed upon the control electrode 6 of the cathode ray tube I through terminal 25 and input condenser 4. The 60 cycle output of the 60 cycle multivibrator controls the deflecting plates of the cathode ray tube I through terminal 29. If the impulse generator is functioning properly, a single dot will appear on the luminescent target element 11. If, however, there is a slight difference in frequency between the auxiliary 60 cycle source and the output of the impulse generator, a trace will appear on the luminescent target element 11 whose form is dependent upon the amount of difference in frequency. Should the output voltage of the impulse generator have a frequency output slightly different than the frequency of the auxiliary source, such as a difference of one cycle per second, the dot on the luminescent target 11 will move from one side of the screen to the other side of the target once per second. The direction of the spot movement depends upon whether the impulse generator output frequency is above or below the frequency of the auxiliary source. Should the impulse generator frequency be above the auxiliary source frequency the spot will move in the direction of deflecting plate 10b and if the impulse generator frequency be below the auxiliary source frequency, the spot will move in the direction of deflecting plate 10a once every second. Should the difference in frequency be two cycles per second, the dot will move across the screen twice per second.

This same operation of the indicating device will be true if any sources of alternating current voltage are compared so that this invention provides an improved means of indicating synchronism or slight deviation in the frequency of a plurality of alternating current voltages. Should the alternating current voltage impressed upon the deflecting plates have a frequency greatly above the frequency impressed on the control electrode 6, a line will appear on the fluorescent screen 11 so that when it is desired to compare frequencies varying by more than one or two cycles per second, it is preferable to impress the higher frequency on the control grid 14 of the gaseous discharge tube 12.

While the invention has been disclosed in two of its preferred forms, it is obvious that various changes in its general organization and arrangement may be made without departing from its true spirit and scope.

Having now described my invention, I claim:

1. In an electric circuit, a plurality of alternating current voltage sources and indicator means for comparing the frequency of said alternating current voltage sources comprising a cathode ray oscilloscope having mean to develop an electron beam and a control electrode for controlling the intensity of the beam and electron beam deflecting means, means for selectively connecting the control electrode of said tube to one of said alternating current voltage sources, and means for selectively connecting the electron beam deflecting means to another of said alternating current voltage sources.

2. In an electric circuit, a plurality of alternating current voltage sources and indicator means for comparing the frequency of said alternating current voltage sources comprising a cathode ray oscilloscope having means to develop an electron beam and a control electrode for controlling the intensity of the beam and electron beam deflecting means, a saw-tooth wave generator connected to said electron beam deflecting means, means for connecting the control electrode of said cathode ray device selectively to one of said alternating current voltage sources, and means for energizing and controlling the saw-tooth wave generator selectively by another of said alternating current voltage sources.

3. In an electric circuit, a plurality of alternating current voltage sources bearing a harmonic frequency relation one to the other and a cathode ray tube, means to indicate the harmonic relation of said alternating current voltage sources, said cathode ray tube having an electron gun to develop an electron beam, a control electrode to control the intensity of the developed beam, a target element, and deflecting means for causing said beam to traverse the target, and a saw-tooth wave generator connected to said electron beam deflecting means for controlling the rate of target traverse by the beam, means for connecting said control electrode selectively to individual ones of said alternating current voltage sources and means for energizing and controlling said saw-tooth wave generator selectively by another of said alternating current voltage sources.

4. In an impulse generator, a plurality of multivibrators connected in cascade, each of said multivibrators having input and output circuits, and means selectively associated with each of said multivibrators for indicating the ratio of the input and output frequency of any stage in the cascade.

5. The impulse generator claimed in claim 4 wherein the means for indicating the ratio of the frequencies of the input and output of any stage in cascade comprises a cathode ray oscilloscope having an electron beam developing means, and means for controlling the intensity of the beam, a beam impact target element and an electron beam deflecting means, means for selectively connecting the input energy of individual ones of said multivibrator to the beam intensity control means, and means for controlling said electron beam deflecting means selectively under the control of the output energy of said multivibrator.

6. In an electric circuit, a multivibrator having an input and an output circuit, an indicator means comprising a cathode ray oscilloscope having an electron beam developing means, a control electrode for controlling the developed electron beam and a beam impact target, deflecting means for causing said beam to traverse said target, a saw-tooth wave generator connected to energize said electron beam deflecting means, means for deriving energy from the input circuit of said multivibrator for energizing said control electrode, and means for controlling the frequency of said saw-tooth wave generator under the control of the output energy of said multivibrator.

7. In a system for comparing the frequencies of alternating current voltages, the combination of a cathode ray device provided with a control electrode, with electron beam deflecting means and with a target element upon which the relation between said frequencies is to be indicated, means for applying one of said voltages to said control electrode, and means for applying another of said voltages to said beam deflecting means.

8. In a system for comparing the frequencies of alternating current voltages, the combination of a cathode ray device provided with a control electrode, with electron beam deflecting means and with a target element upon which the relation between said frequencies is to be indicated, a saw-tooth wave generator connected to said beam deflecting means, means for applying one of said voltages to said control electrode, and means for applying another of said voltages to said saw-tooth wave generator.

9. In a system for comparing the harmonic frequency relation of alternating current voltages, the combination of a cathode ray device provided with a control electrode, with electron beam deflecting means and with a target element upon which the relation between said frequencies is to be indicated, means for applying one of said voltages to said control electrode, and means for applying another of said voltages to said beam deflecting means.

10. The combination of a plurality of frequency changers connected in cascade, and means for comparing the input and output of each of said frequency changers comprising a cathode ray device provided with a control electrode, electron beam deflecting means and with a target element upon which the relation between said frequencies is to be indicated, said control electrode being selectively connected to one of said frequency changers and said electron beam deflecting means being selectively connected to another of said frequency changers.

11. The combination of a plurality of frequency changers connected in cascade, and means for comparing the input and output of each of said frequency changers comprising a cathode ray device provided with a control electrode, electron beam deflecting means and with a target element upon which the relation between said frequencies is to be indicated, said control electrode being selectively connected to the input of one of said frequency changers and said electron beam deflecting means being selectively connected with the output of said frequency changer whose input is selectively connected to said control electrode.

12. The combination of a frequency changer having input and output circuits and indicator means comprising a cathode ray oscilloscope having a control electrode and electron beam deflecting means, a saw-tooth wave generator being connected to said electron beam deflecting means, said control electrode being connected to one of said circuits and said saw-tooth wave generator being connected to another of said circuits.

WALDEMAR J. POCH.